Patented Aug. 3, 1954

2,685,605

UNITED STATES PATENT OFFICE 2,685,605

SYNTHESIS OF MERCAPTANS

Richmond T. Bell, Grays Lake, Ill., assignor to
The Pure Oil Company, Chicago, Ill., a corporation of Ohio No Drawing. Application March 16, 1953,
Serial No. 342,710

11 Claims. (Cl. 260—609)

This invention relates to the preparation of mercapto organic compounds. More specifically it is concerned with the production of alkyl thioalcohols. This application is a continuation-in-part of application Serial Number 148,005, filed March 6, 1950, now abandoned.

The synthesis of alkyl mercaptans may be accomplished by properly choosing from a number of reactions available which will produce the desired mercaptan in the reaction effluent. The first reported synthesis of a mercaptan involved the contacting of sodium ethyl sulfate with an aqueous solution of sodium hydrosulfide. Other alkylating agents, such as alkyl halides, will react similarly. Another reaction for the preparation of mercaptans is that in which hydrogen sulfide and olefins are made to react. In such additions of an unsymmetrical addend to an unsymmetrical olefin the predominant direction of addition depends primarily on the polarity of the parts of the addend, other things being equal, but is profoundly affected by a number of other factors, such as the structure of the olefin, kind and location of substituents in the olefin molecule, presence and kind of catalyst, presence and kind of solvent, and any directive agents present either by design or as impurities. With the more common olefins and in the absence of catalytic effects, a very small degree of addition can be achieved under proper conditions of temperature and pressure, with the addition usually in accordance with Markownikoff's rule. Peroxides, however, influence the direction of reaction besides exerting some catalytic activity. Thus in the presence of peroxides, either added or in the olefin as impurities as is often the case, predominantly abnormal addition, contrary to Markownikoff's rule, takes place and under comparable conditions the extent of conversion is considerably greater than with no catalyst. Again the presence of metallohydrocarbon compounds, such as the metal alkyls and aryls of lead, mercury and tin, and under the influence of actinic radiation having a wave length below 3000 angstrom units, an abnormal addition with reference to Markownikoff's rule takes place. Other processes involve the passage of an alcohol and hydrogen sulfide over a metallic oxide catalyst such as thoria. In still other methods mercaptans are formed by a cleavage of disulfides with metallic sodium or potassium sulfide or by the treatment of a Grignard reagent with sulfur. Obviously the choice of reaction is influenced by such considerations as ease of operation, reaction conditions, and availability of starting reactants in relation to economic considerations and the particular mercaptan product desired.

The availability of ready sources of inexpensive synthetic alcohols plus an abundant supply of hydrogen sulfide available as a by-product from the petroleum industry makes the condensation reaction in which the hydroxyl group present in an alcohol, such as methanol, is substituted by the monovalent sulfhydryl group from a hydrogen sulfide source in the presence of a metallic oxide catalyst, such as thoria, an attractive and economical process for the production of thiols with the sulfhydryl group in the same position as the hydroxyl group of the parent alcohol and for the production of methanethiol which obviously cannot be derived by addition to an olefin and is difficult to synthesize economically by other methods. In spite of the fact that this method has been academically known for some time for a few alcohols, such as butyl and isopropyl, only a small amount of old, incomplete and relatively crude data is extant. Relative to the particular use of methanol, such information is substantially inexistent. Although side reactions that take place result in the substantial formation of thioethers, there is scant information in the prior art regarding this substantial conversion or means for mitigating the effect of side reactions.

Accordingly, it is an object of this invention to present an improved process for the preparation of methanethiol by reacting methanol and hydrogen sulfide in the presence of a catalyst capable of splitting off water. It is another object to lengthen the life of the catalyst and provide a means for greatly increasing the conversion of the reactants to methanethiol in relation to conversion to other products. Still another object is a method for retarding the formation of undesirable side reactions and thereby improve the selectivity of the process.

My invention consists of the introduction of small amounts of water into the reaction zone wherein methanol vapors are contacted with hydrogen sulfide in the presence of a catalyst to form methanethiol. The water may be introduced into the reaction zone either admixed and/or concomitantly with the reactants, the former method being preferable. I have found that by introducing water into the reaction zone, the resulting yields of mercaptans are greatly increased and that conversely the yield of thioethers is decreased and the catalyst life is greatly lengthened as opposed to the results obtained when no water is introduced.

My invention is further exemplified by the following illustrative but non-limiting examples.

In the reaction of methanol and hydrogen sulfide in the presence of a pumice-supported thoria catalyst containing about 7.3 mol percent of thoria to form methanethiol and dimethyl thioether conducted at a temperature of 716° F. and a liquid hourly volume space velocity of 0.58, a reactant mixture containing equimolar portions of methanol and hydrogen sulfide and 0.5 mol percent of water produced a total conversion of 32 percent, based on methanol, in a 4 hour run at steady state. Of the methanol that was converted 86 percent was converted into methanethiol which indicates that the presence of water mitigates the substantial formation of side products such as the thioether. This feature, which is termed selectively, is defined as the percent of reacted methanol which was converted into methanethiol. In the absence of water but using the same reaction conditions of time, temperature and catalyst, the total conversion, based on methanol, amounted to 22 per cent and the aforementioned selectivity decreased to 66 per cent.

When the reaction temperature was increased to 788° F. and the space velocity was varied slightly to 0.59, a reactant mixture containing equimolar amounts of methanol and hydrogen sulfide and 0.5 mol percent water which was contacted with a pumice-supported thoria catalyst containing about 7.3 mol percent of thoria yielded a total conversion of 55 percent, based on methanol, the aforedescribed selectivity being 86 percent. Again the reaction was conducted under the same reaction conditions of time, temperature and catalyst with no water present and a total conversion of 35 percent was obtained with a selectivity of 62 percent. In both of these examples the length of each run at steady state was again four hours.

It is thus seen from the foregoing examples that increases in total conversion of about 50 percent were obtained in each instance when small amounts of water were introduced into the reaction zone.

The beneficial effects of carrying out the reaction between methanol and hydrogen sulfide in the presence of small amounts of water are further demonstrated by the following illustrative experiments:

A quantity of freshly prepared thoria catalyst was divided into two portions, one portion being used to catalyze the subject reaction in the absence of water, the other portion being used to catalyze the subject reaction in the presence of added amounts of water. The catalysts used in carrying out these runs were in each instance preconditioned according to United States Patent 2,592,646.

In the former instance the reaction was carried out continuously for 95 hours. During this period the reaction temperature was varied between about 705° F. and 750° F., while liquid hourly volume space velocities between about 0.24 to about 1.02 were used. Other reaction conditions which were investigated were pressure, pressures of 0, 5 and 135 pounds per square inch gauge being investigated, and molar ratio of reactants. With regard to this latter variable, ratios of hydrogen sulfide to methanol of 0.84 to 4.17 were used. During the investigation of the effect of each specific variable condition investigated, all operating conditions were maintained constant for at least a sufficient time to permit a steady state to be obtained for each condition studied. Although substantial conversions of methanol were initially obtained, the activity of the catalyst diminished to such an extent that at the end of 95 hours of continuous operation substantially no conversion of the methanol was obtained. The average selectivity or percent of reacted methanol which was converted to methanethiol for the entire run was 75 percent.

When, however, the reaction between methanol and hydrogen sulfide was catalyzed with the remaining portion of the catalyst and carried out in the presence of small amounts of added water, the life of the catalyst was extensively prolonged and the sensitivity increased.

At the start of the run in which water was used, the ratio of hydrogen sulfide to methanol was 2:1. The reaction was carried out at a temperature of 725° F., a pressure of 100 pounds per square inch gauge and a liquid hourly volume space velocity of 0.35 in the presence of 0.36 mol percent of water. These conditions were maintained substantially constant for a period of 205½ hours during which time no regeneration of the catalyst was carried out. For this period the average conversion was about 45 percent and the selectivity about 85 percent, resulting in an average yield of methanethiol of about 38 mol percent. Without regenerating the catalyst the run was continued in the presence of increased amounts of water, viz., 3.02 mol percent. After continuing the reaction for about 50 hours under these conditions, the average yield of methanethiol for this period decreased to about 28 percent. There was, however, no change in selectivity. By decreasing the amount of added water to 0.36 mol percent, the yield of methanethiol increased to 38 percent after 9 hours of operating under these conditions. Thus after an elapsed time of 264 hours of operation without regenerating the catalyst, methanethiol yields of 38 percent were being obtained at a selectivity of 85 percent. This, compared with 0 percent yield of methanethiol after 95 hours of continuous operation without using added water, emphatically demonstrates the marked superiority of the instant invention. Prior to shutting down the unit the run was continued for another 12 hours during which period several different pressures and temperatures were employed. During this period the methanethiol yield and selectivity remained consistently high and the catalyst gave no indication of decreasing in activity.

The unusualness of this invention is further pointed out by analyzing the reaction in light of the laws of chemical equilibria. As one of the incidental products of reaction, water is formed. Therefore one would normally deduce that increasing the molar concentration of water by the addition of more water would suppress to some extent rather than increase the total conversion. Instead, however, a substantial increase in conversion and improvement in selectivity occurs.

Such unexpected and highly desirable results obviously must be caused by effects having no connection with the law of mass action. Also, said effects must be of much greater magnitude in order to completely obliterate any concurrent mass action effect. While I do not intend to be limited in the scope or operation of my invention by any proposed explanation or theory of the mechanism of the phenomenon educed by my invention, I consider that the substantial increase in catalyst activity produced by the presence of small amounts of water is a catalyst surface phenomenon probably arising from various possible equilibria of water molecules or radicals derived therefrom, such as the hydroxyl radical, with the surface structure of the catalyst. With larger amounts of water, the increase in catalytic activity becomes much less in relation to the quantity of water continuously introduced, and in addition decrease in conversion resulting from mass action effect becomes pronounced as the concentration of water in the entering mixture is increased.

In addition to this increase in total conversion it will be noted from the examples that I am able to increase the life of the catalyst and also retard the formation of undesirable side products in the form of the thioethers. Specifically, I am primarily concerned with the synthesis of mercaptans and by increasing the conversion ratio of thiols to thioethers, I thus obtain a greater yield of the desired mercaptan.

As indicated above small proportions of water are used. Although the optimum concentration will vary to some extent, depending upon the reaction conditions and/or metallic oxide catalyst used, I find that the described increases in conversion and selectivity are brought about if the water is introduced in an amount between about 0.01 and about 5 mol percent, and it is usually preferable to use water in an amount between about 0.01 and about 1 mol percent.

The reaction of methanol and hydrogen sulfide to form methanethiol may be conducted at a temperature between about 575° F and about 850° F., and at a liquid hourly volume space velocity of between about 0.05 and about 1.5 and preferably between about 0.2 to 0.7. Space velocity as used herein is defined as the liquid volume of methanol passed per hour per unit volume of catalyst. Superatmospheric reaction pressures of about 50–200 pounds per square inch gauge are preferably used, although the reaction can be carried out at subatmospheric or atmospheric pressures. It may be found advantageous to conduct at least the recovery and separation sections of the process under superatmospheric pressures in order to reduce the degree of refrigeration required. For the production of methanethiol, the quantities of reactants employed are preferably substantially in stoichiometric proportion in order to avoid unnecessary complication such as in recovery. However, wide deviations therefrom may be employed and ratios of hydrogen sulfide to methanol between 1:10 to 10:1 can be used.

Although the above examples recite the use of a pumice-supported thorium oxide catalyst, a more latitudinous choice of catalysts is available in practicing this invention. The reaction is preferably conducted in the presence of thorium oxide per se or supported on a pumice carrier, although other carriers such as activated alumina, bauxtie, montmorillonite type clays, carbon and silica gel may be employed. Although other ratios of carrier to thoria may be used, I have found that a catalyst containing essentially thoria and pumice is sufficiently effective when the composition of the catalyst has an economical pumice/thoria mole ratio of about 13:1. In determining the mols, the molecular weight of purified pumice was closely estimated to be 67.7. Other metallic oxide catalysts that are effective in carrying out the reaction of my invention are the oxides of zirconium, titanium, uranium, tungsten, molybdenum, chromium, vanadium, manganese, zinc, cadmium, and aluminum. Although all oxides of the foregoing metals are effective for the purposes of this invention, in cases where several oxides may be prepared the intermediate oxides between the lowest oxide and the highest oxide, whether well-defined or more in the nature of consistent molar compounds or mixtures, of higher and lower oxides, are preferred.

In the case of zirconium, there is satisfactory evidence only for zirconium dioxide, $ZrO_2$, but if the existence of other oxides were established, they would be higher and lower than $ZrO_2$. Hence $ZrO_2$ still would be the preferred oxide of zirconium.

Titanium forms four well-defined oxides, $TiO$, $Ti_2O_3$, $TiO_2$, and $TiO_3$, and titanium dioxide, $TiO_2$, is the preferred oxide with $Ti_2O_3$ and the questionable $Ti_3O_4$ of lesser degree of preference.

The principal oxides of uranium are $UO_2$, $UO_3$, and the intermediate oxide, $U_3O_8$, uranium tritaoctoxide, which is preferred together with uranium dioxide, $UO_2$.

In addition to the clearly defined tungsten hemipentoxide, $W_2O_5$, tungsten dioxide, $WO_2$, and tungsten trioxide, $WO_3$, six other tungsten oxides, not as well-defined, are known. For example, there is the greenish-blue tungsten tetratrioxide, $W_4O_3$, the blue tungsten monoxide, $WO$ (or $W_2O$, $WO_2$), the blue tungsten hemitrioxide, $W_2O_3$, and the blue tungsten pentitaenneaoxide, $W_5O_9$, and tungsten pentitaoctoxide, $W_5O_8$. This series of "blue oxides" is intermediate between tungsten monoxide and tungsten dioxide. Another series of "blue oxides" of tungsten is intermediate between tungsten dioxide and tungsten trioxide. For example, the well-defined bluish-violet $W_2O_5$, the deep purple $W_3O_8$, $W_4O_{11}$, and $W_5O_{14}$ have been obtained. It is the intermediate oxides, principally those commonly called "blue oxides," of tungsten, including $WO_2$ which are preferred for the purposes of this invention.

The preference is similar with respect to molybdenum oxides. The existence of molybdenum monoxide, $MoO$, is not certain, but molybdenum hemitrioxide, $Mo_2O_3$, and molybdenum trioxide are well-defined and the intermediate dark blue-violet or violet molybdenum dioxide, $MoO_2$, is fairly well established. Many "blue oxides" of molybdenum have been obtained with analyses clustered between that of $MoO_2$ and $MoO_3$. One commonly called "molybdenum blue" is considered to be molybdenum tritaoctoxide, $Mo_3O_8$. It has the unusual property of being soluble in a large number of organic solvents and therefore is of particular interest for the preparation of catalysts to be used in the processes of this invention. A natural "molybdenum blue," called ilsemannite, has a composition close to $Mo_3O_8$. Molybdenum hemipentoxide, $Mo_2O_5$ (or $MoO_2.MoO_3$), is known as dark violet or violet-black intermediate oxide. Molybdenum pentitatetradecaoxide, $Mo_5O_{14}$ (or $MoO_2.4MoO_3$), is another intermediate oxide, dark blue, the preparation and existence of which has been confirmed. Again it is the intermediate oxides, principally those commonly called "blue oxides" of molybdenum, including $Mo_2O_3$ and $MoO_2$ which are preferred.

In the case of chromium oxides, it is the oxides intermediate between chromium monoxide, CrO, and chromium trioxide, $CrO_3$, which are preferred. Included, for example, are chromium tritatetroxide, $Cr_3O_4$ (or $CrO.Cr_2O_3$), chromium hemitrioxide, $Cr_2O_3$, chromium dioxide, $CrO_2$ (or $Cr_2O_4$, or $Cr_2O_3.CrO_3$) and a number of less well-defined oxides intermediate between $Cr_2O_3$ and $CrO_3$.

Similarly, with respect to vanadium oxides, it is the oxides intermediate between vanadium monoxide, $V_2O_2$, and vanadium hemipentoxide, $V_2O_5$, which are preferred. These consist principally of the two well-defined oxides—vanadium hemitrioxide, $V_2O_3$, and vanadium dioxide, $V_2O_4$. However $V_2O_5$ is only slightly less preferred.

The preferred intermediate oxides of manganese are between manganese monoxide, MnO, and manganese hemiheptoxide, $Mn_2O_7$, the existence of $MnO_4$ being very doubtful and $Mn_2O_7$ entirely out of consideration as a catalyst anyhow. The principal intermediate oxides are the well-defined manganese tritatetroxide, $Mn_3O_4$ (or $MnO.Mn_2O_3$), manganese hemitrioxide $Mn_2O_3$ (or $MnO.MnO_2$), manganese dioxide, $MnO_2$, and manganese trioxide, $MnO_3$.

There are no intermediate oxides known for zinc, cadmium, and aluminum, or other established oxides besides ZnO, CdO, and $Al_2O_3$. Thus no preference is possible except that in the case of $Al_2O_3$, it is much preferred to use the modification known as activated alumina for a carrier and/or catalyst.

While the foregoing discussion has been directed to the utilization of metallic oxide catalysts for carrying out the instant invention, it is intended that this invention also may be employed in conjunction with other catalysts which are capable of beneficially affecting the reaction between methanol and hydrogen sulfide to produce methanethiol. Other suitable catalysts include, in addition to the aforementioned oxides, the phosphates, halides, sulfates or sulfides of zirconium, titanium, uranium, tungsten, molybdenum, chromium, vanadium, manganese, zinc, cadmium, and aluminum or these metals in their elemental form.

The mercaptans obtainable by the present invention are useful as intermediates for the production of methionine and other pharmaceuticals, detergent sulfonium compounds and other surface-active agents, dyestuffs, alkylated hydrocarbons, compounds important as insecticides and as rubber chemicals, and organic sulfur compounds such as sulfides, sulfoxides, sulfones, sulfinic acids, sulfonic acids, and thioacetals, and are useful as modifiers in the emulsion polymerization process for synthetic rubber, as solvents or modifiers in the manufacture of polymerization or condensation products such as resins, plastics, and elastomers, as anti-oxidants and anti-corrosion agents in lubricating oil, as antioxidants in stored unsaturated compounds, as assistants in the textile industry, as warning odorants in gases, and in insect-repellents and insecticides.

Therefore, in recapitulation, it is seen that the essence of this invention resides in the introduction of small amounts of water into the reaction zone simultaneously with the reactants. I have found that the addition of water greatly enhances the activity, selectivity, and length of life of metallic oxide catalysts employed in the production of thiols and/or thioethers formed in the reaction between alcohols and hydrogen sulfide.

The expression "simultaneously with," used in the instant claims of this invention with reference to the introduction of the water into the reaction zone, is to be interpreted so as to connote that the said water introduction may be effected in admixture with and/or concomitantly with the said alcohol and hydrogen sulfide mixture. "Total charge" is to be interpreted as being equal to the proportions of alcohol and hydrogen sulfide plus the minor proportions of water introduced into the reaction zone.

It is to be understood that water in either the liquid or vapor state may be employed and the use of the word "water" in the specification and claims is to be construed accordingly.

I claim:

1. In a process for the production of methanethiol wherein methanol is reacted with hydrogen sulfide in the presence of a catalyst capable of splitting off water at an elevated temperature sufficient to effect said production, the improvement consisting of adding a small amount of water not exceeding about 5 mol percent, based on total charge, to the reaction zone simultaneously with the reactants.

2. In a process for the production of methanethiol wherein methanol is reacted with hydrogen sulfide in the presence of a metallic oxide catalyst capable of splitting off water at an elevated temperature sufficient to effect said production, the improvement consisting of adding a small amount of water not exceeding about 5 mol percent, based on total charge, to the reaction zone simultaneously with the reactants.

3. A process in accordance with claim 2 in which the temperature is from about 575° F. to about 850° F.

4. A process in accordance with claim 2 in which the water is added in an amount between about 0.01 mol percent and about 5 mol percent, based on total charge.

5. A process in accordance with claim 4 in which about 0.5 mol percent of water is added.

6. In a process for the production of methanethiol wherein methanol is reacted with hydrogen sulfide in the presence of thoria catalyst at an elevated temperature sufficient to effect said production, the improvement consisting of adding a small amount of water not exceeding about 5 mol percent, based on total charge, to the reaction zone simultaneously with the reactants.

7. A process in accordance with claim 6 in which the temperature is from about 575° F. to about 850° F.

8. A process in accordance with claim 6 in which the water is added in an amount between about 0.01 mol percent and about 5 mol percent, based on total charge.

9. A process for the production of methanethiol which comprises contacting a reaction mixture consisting essentially of methanol, hydrogen sulfide, and water, said water being introduced simultaneously with said methanol and hydrogen sulfide in an amount between about 0.01 mol percent and about 5 mol percent, based on total charge, in a reaction zone at a temperature within the temperature range of about 575° F. to about 850° F. with a catalyst consisting essentially of thoria supported on a carrier.

10. A process in accordance with claim 9 in which a space velocity of from about 0.05 to about 1.5 is employed.

11. A process for the production of methanethiol which comprises introducing methanol and hydrogen sulfide simultaneously with about 0.5 mol percent of water, based on total charge, into a reaction zone, contacting the mixture consisting essentially of methanol, hydrogen sulfide, and water at a temperature of from about 575° F. to about 850° F. with a pumice-supported thoria catalyst, removing the products of said reaction from contact with said catalyst, and separating therefrom the methanethiol.

References Cited in the file of this patent

UNITED STATES PATENTS

| Number | Name | Date |
|---|---|---|
| 2,116,182 | Baur | May 3, 1938 |
| 2,514,299 | Sumerford | July 4, 1950 |
| 2,514,300 | Laughlin | July 4, 1950 |